United States Patent [19]
Holmes

[11] 3,727,642
[45] Apr. 17, 1973

[54] VACUUM COMPENSATING DEVICE FOR ENGINE COOLING SYSTEM AND METHOD OF INSTALLING SAME

[75] Inventor: Allie B. Holmes, Corpus Christi, Tex.

[73] Assignee: Opti-Cap Inc., Corpus Christi, Tex.

[22] Filed: Mar. 9, 1970

[21] Appl. No.: 17,620

Related U.S. Application Data

[62] Division of Ser. No. 762,254, Sept. 16, 1968, Pat. No. 3,521,702.

[52] U.S. Cl............................................138/30
[51] Int. Cl..........................................F16l 55/04
[58] Field of Search..........................138/30, 26; 123/41.5

[56] References Cited

UNITED STATES PATENTS

| | | |
|---|---|---|
| 3,473,565 | 10/1969 | Blendermann.................138/30 V |
| 3,115,162 | 12/1963 | Posh..............................138/30 |
| 3,091,258 | 5/1963 | Marette........................138/30 |
| 3,331,399 | 7/1967 | Von Forell....................138/30 |

*Primary Examiner*—Herbert F. Ross
*Attorney*—Walter Kruger

[57] ABSTRACT

An engine cooling system including a vacuum compensating device in fluid communication with the system. The compensating device maintains the cooling system full at all times and reduces stress on the system. A viewing device is substituted for the usual cap on the radiator filling neck to allow visual determination of the coolant level, and the viewing device seals the radiator. The invention also includes a unique vacuum compensating device including a flexible liner, a method of installing a fitting on the radiator to connect the compensating device to the radiator, and unique brackets to mount the compensating device on the wall of the engine compartment adjacent the radiator.

4 Claims, 16 Drawing Figures

INVENTOR
ALLIE B. HOLMES

VACUUM COMPENSATING DEVICE FOR ENGINE COOLING SYSTEM AND METHOD OF INSTALLING SAME

This application is a division of my copending application Ser. No. 762,254, filed Sept. 16, 1968 now U.S. Pat No. 3,521,702, for Vacuum Compensating Device for Engine Cooling System and Method of Installing Same.

This invention relates to an improved engine cooling system which is maintained substantially full of liquid coolant at all times during normal operation, whereby the cooling system operates at maximum efficiency.

The invention also relates to a cooling system including an improved compensating device which automatically compensates for vacuum created in the cooling system when the engine is off and the coolant cools, but which maintains the system full of coolant regardless of engine operating conditions within a normal range.

The invention in addition relates to an improved vacuum compensating device for an engine cooling system, an improved mounting arrangement for the compensating device, and a unique method of connecting the device to the heat exchanger or radiator of the cooling system.

The usual engine cooling system includes a water jacket associated with the engine, and usually formed integral with the engine block, a radiator or heat exchanger mounted adjacent the engine and through which the coolant from the engine is circulated, a circulating device such as a water pump which circulates the coolant, and in the case of most automotive vehicles, a fan which draws air through the radiator to cool the coolant.

Most presently available American automobiles have radiators of the upright type which include a heat exchanger core, and upper and lower end tanks connected to the core. The engine cooling jacket has an outlet, and an inlet at a lower elevation than the outlet. Coolant is circulated by the water pump from an upper outlet of the engine cooling jacket to the top of the radiator, then downwardly through the radiator core, and then from the bottom tank of the radiator to the inlet of the engine cooling jacket. Since the flow through the radiator is from top to bottom and since the temperature of the coolant is reduced as it flows through the radiator, this system utilizes normal convection flow of the liquid coolant to assist pump circulation of the coolant through the system. Since engine coolant becomes less dense as it is heated, there is also a natural convection flow of the coolant from the lower elevation inlet to the higher elevation outlet of the cooling jacket.

Internal combustion engines operate most efficiently when the temperature of the coolant leaving the cooling jacket outlet is approximately 180°F. However, since an engine cooling system must be of sufficient size to maintain the coolant entering the engine at a temperature below the optimum 180° F., under any expected operating conditions (such as when ambient temperatures are as high as 110° F.) a thermostat is usually provided at the outlet of the engine cooling jacket and functions to limit flow through the engine if the temperature of the coolant is lower than optimum.

For the cooling system to operate most efficiently, the system should be completely full of coolant. Present day cooling systems are of the pressurized type in which the coolant is maintained under a positive pressure of from 8 to 15 p.s.i. above atmospheric pressure. With the coolant under this higher pressure, the boiling temperature of the coolant is increased to substantially more than the 212° F. boiling point of water at sea level pressure. If it were possible to operate an internal combustion engine continuously, the radiator could be completely filled with coolant, while the engine is hot, and the cooling system would then operate at optimum efficiency. However, in the case of the usual automobile or other motor vehicle engine, the engine is not running continuously, but is frequently started and stopped. Each time the engine is stopped for any considerable time, the coolant cools from the optimum operating temperature of 180° F. to the outdoor temperature, which, for purposes of illustration, shall be taken as 70° F. Such cooling causes substantial contraction of the coolant, and a substantial vacuum would be created within the cooling system were it not for the usual vacuum relief valve which is incorporated in the radiator cap of a pressurized cooling system and which opens as soon as a vacuum is present in the system. Thus, each time the engine cools, the vacuum relief valve opens and air is drawn into the cooling system. Then, when the engine is started and the coolant is again heated, the vacuum valve closes and pressure begins to build up in the system almost immediately. Since, as the incompressible coolant expands, the air drawn into the cooling system must be expelled, the overpressure relief valve of the radiator cap opens to release this air. However, this air is not really air but is in fact a vapor, and hence, when the overpressure valve opens to release the air, as the coolant expands, some coolant is lost each time the coolant is heated.

Another shortcoming of the known automotive cooling systems is that the build up of pressure within the cooling system occurs at a time when the cooling system is in the poorest state to accommodate the pressure, namely, when the various parts of the system are cold. When these parts are cold, there is a tendency for the usual rubber hoses to be less resilient and hence more apt to develop cracks than when the coolant is first heated. In addition, the various clamp connections of the cooling system, such as between the hoses and the radiator or engine block, are in a contracted state and hence are much more likely to leak at low temperatures than at the normal operating temperature of the cooling system. This is especially true where the coolant contains a glycol base antifreeze which has a wetting action and is hence much more likely to leak through minute openings.

Another recently developed cooling system is the cross flow type where flow of liquid coolant through the radiator is horizontally from one side to the other. Such cross flow radiators have gained acceptance by some manufacturers because they have a smaller vertical height and thus permit designing the automobile with a lower hood line, since the radiator is customarily mounted adjacent the front of the automobile. For cross flow type radiators to operate efficiently, these radiators must be maintained full of coolant. Hence, an auxiliary radiator tank is provided in the vehicle at a location above the level of the top of the radiator and a large diameter conduit connects the auxiliary tank to the radiator. The auxiliary tank is usually provided with the normal radiator filling neck which is closed by a radiator pressure-vacuum cap in the usual manner. Within this auxiliary tank, the same conditions prevail as at the top of the upright type radiator, namely, the coolant fills the tank when it is heated and expands, but contracts and draws air into the tank via the radiator cap vacuum valve, as it cools.

In my U.S. Pat. No. 3,307,620 granted Mar. 7, 1967, there are disclosed several embodiments of vacuum relief devices for engine cooling systems which function quite well to prevent the undesirable pressure buildup and introduction of air into cooling systems of internal combustion engines. The present invention represents substantial improvements over that system which improve the durability and reliability of the vacuum compensating device, simplify installation of the vacuum compensating device, and more readily adapt the vacuum compensating device for use with the modern automobile which has limited space in the engine compartment and in which mounting of even small accessories where the vehicle is equipped with such devices as air conditioning and power steering is quite difficult.

The improved attachment, in accordance with this invention, takes the form of an elongated cylinder or cannister which advantageously is connected to the radiator by a small diameter tube or hose that communicates with the interior of the cannister. Located within the cannister is a flexible large diameter tube which extends the length of the cannister. In the preferred embodiment, the tube is resilient and has a normal relaxed outside diameter which is greater than the inside diameter of the cylinder or cannister. Hence, the resistance of the tube to vacuum in the system is minimal and the tube readily collapses to "follow" the coolant in the system when the coolant cools. The tube or hose from the radiator connects to the bottom of the cannister, and the opposite end or top of the cannister is provided with a filling opening which takes the form of the usual radiator filling neck of conventional internal combustion engines.

The filling neck on the vacuum compensating device facilitates filling the cooling system of an engine equipped with the device.

In the engine cooling system equipped with this vacuum compensating device, a special radiator type cap is used to close the filling opening of the attachment. This radiator cap is considered special because its vacuum relief valve is set to open only when the vacuum in the cooling system exceeds a value of about 1 p.s.i. below atmospheric pressure. The filling neck of the radiator of the cooling system with which the compensating attachment is used is sealed by a transparent viewing cone which seals against the usual sealing flange of the radiator neck. This viewing cone extends into the radiator tank a sufficient distance to enable one to merely look at the viewing cone and positively ascertain that the radiator is full of coolant. Advantageously, the viewing cone is maintained in sealed relation with the sealing flange of the radiator neck by a compression spring selected to allow the cone to act as an overpressure relief valve, and the spring is so selected that the pressure at which the viewing cone functions to relieve excess pressure is slightly higher than the pressure at which the normal pressure relief valve of the cap on the compensating device opens.

Hence, in the event that an abnormal condition occurs within the radiator which causes pressures sufficient to open the pressure relief valve on the compensating device, the overpressure valve on the radiator neck will not normally open. However, since the compensating attachment is connected to the cooling system by a relatively small diameter hose, rapid buildup of pressure may not be able to escape through the compensating device. Under these conditions, the viewing cone valve will open to prevent explosion or other damage to the cooling system of the engine.

By sealing both the radiator neck and the compensating device opening, sufficient vacuum is created within the cooling system each time the coolant cools to assure that liquid coolant in the compensating device is drawn or sucked back into the cooling system to maintain the system full, and that the flexible tube collapses as the coolant is drawn into the cooling system. If the vacuum valve on the compensating device were to open immediately without first allowing a slight vacuum to occur in the system, air would be drawn into the compensating device, above the liquid in the device with the result that the flexible tube would not collapse and hence, a relatively high pressure would be created within the cooling system when the coolant is again heated.

As the engine warms up and the coolant is heated, pressure builds up in the system. Ideally, there should be no positive pressure in the system until the coolant reaches the optimum operating temperature. With applicant's improved compensating attachment, the system including the compensating device is maintained full of liquid coolant both when the coolant is cold and when the coolant is heated to operating temperatures. Hence, when the coolant is cold the flexible tube is virtually completely collapsed, but both the compensating attachment and the cooling system are completely full of liquid. When the coolant is at its normal operating temperature, the flexible tube is expanded against the wall of the casing, which prevents over-expansion of the tube, and both the compensating device and the cooling system are again substantially full of liquid. In practice, however, it has been difficult to maintain both the compensating device and the cooling system completely full of coolant at all times. Instead, a slight amount of air is usually in the upper end of the compensating device adjacent the radiator cap that closes the device. This slight amount of air does not, however, adversely affect the operation of the compensating device since pressure in the cooling system does not begin to rise until there has already been a substantial increase in temperature of the coolant.

Correspondingly, an object of this invention is to provide an improved cooling system including a vacuum compensating device having a flexible wall and in which a vacuum relief valve on the compensating device permits creation of a vacuum in the system to assure collapse of the compensating device while still protecting the cooling system against excessive vacuum.

Another object is an improved vacuum compensating device for a cooling system which is particularly adapted to be mounted in the engine compartment of a motor vehicle;

Another object is a vacuum compensating attachment for an internal combustion engine, the attachment being rugged and durable and having provision for completely filling the compensating device with liquid, thereby eliminating air pockets within the compensating device;

Another object is a vacuum compensating device which can readily be connected to an already manufactured cooling system for an engine, and therefore, the compensating device can be used with any existing engine cooling system;

A further object is an improved compensating device for an engine cooling system which is inexpensive to manufacture, long lasting, and which is tubular and elongated to facilitate mounting same in the crowded engine compartment of the modern automobile;

A still further object is a unique mounting bracket to facilitate mounting the attachment within or adjacent the engine compartment of a motor vehicle;

A still further object of this invention is a unique method of connecting the compensating device to the radiator or heat exchanger of the engine cooling system with minimum effort and using only simple hand tools so the installation of the compensating device does not require the services of a mechanic.

Numerous other features and advantages of this invention will become apparent with reference to the accompanying drawings which are illustrative of the preferred embodiments of the features of this invention, and in which.

Figure 1:
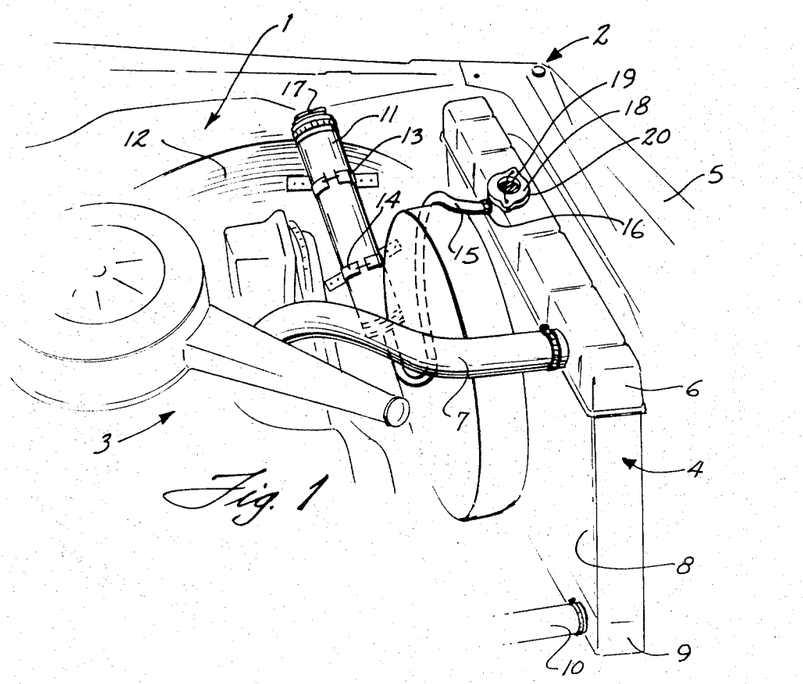
FIG. 1 is a pictorial view of the engine compartment of a motor vehicle showing the vacuum compensating device of this invention mounted on a side wall of the engine compartment and connected to the radiator for the engine.

Referring how to the drawings in detail and particularly to FIG. 1, there is shown the engine compartment 1 of an automobile 2. Located within the engine compartment is an engine 3 having the usual water cooling jacket, and a heat exchanger or radiator 4 mounted in the forward portion of engine compartment 1 immediately behind grill 5. The outlet of the water jacket of engine 3 connects to the upper tank 6 of radiator 4 via a radiator hose 7. The liquid coolant in the system flows through upper hose 7 to upper tank 6, then through core 8 of the radiator and ultimately back out of the lower tank 9 of the radiator and through lower hose 10 which is connected to the inlet of the water jacekt of motor 3.

Mounted in the engine compartment is a vacuum compensating device 11. The vacuum compensating device is secured to inner wall 12 of the engine compartment by suitable screws threaded into the wall and which pass through the straps of mounting bracket assemblies 13 and 14. As shown, compensating device 11 is mounted in a generally upright position and is connected to the top tank 6 of the radiator by a tubular conduit in the form of a heater hose 15, one end of hose 15 being clamped to a connector assembly 16 extending through the side of upper tank 6 of the radiator. Advantageously, the vacuum compensating device 11 is mounted within engine compartment 1 so that a substantial portion of the compensating device is below the level of the top of radiator 4.

The upper end of vacuum compensating device 11 is closed by a radiator cap assembly 17 which includes an overpressure relief valve and a vacuum relief valve. The vacuum relief valve of cap 17 is adjusted to open only when the vacuum within the engine cooling system exceeds 1–2 p.s.i. below atmospheric pressure.

The filling neck of radiator 4 is sealed by a radiator closure assembly 18 which advantageously includes a transparent viewing element 19. Advantageously, the cap portion 20 of closure assembly 18 is fixed to the radiator against removal as by wiring the cap in position. Fixing the cap against removal prevents its inadvertent removal by a gasoline station attendant attempting to check the coolant level in radiator 4, who does not realize the closure assembly includes a viewing cone 19. Closure assembly 18 will subsequently be described in detail, and a modified version of the closure assembly will also be described subsequently.

Figure 2:
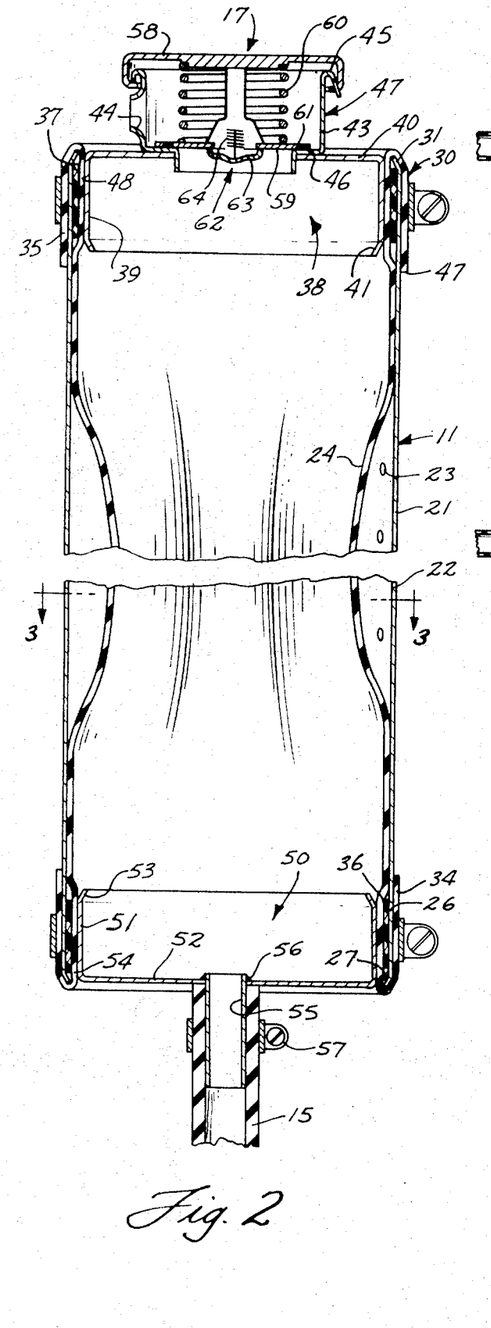
FIG. 2 is a view in longitudinal section of the vacuum compensating device.

FIG. 2 shows vacuum compensating device 11 in longitudinal section. The compensating device has an elongated cylindrical cannister portion or sleeve 21 formed from sheet metal. Sleeve 21 has a rigid body portion 22 provided with several vent openings 23 that extend through the body portion and prevent pressure buildup between sleeve 21 and tubular liner 24. A plurality of axially extending equally circumferentially spaced slots 25 are provided in lower end portion 26 of sleeve 21. Slots 25 originate at lower end edge 27 and extend axially a short distance along the sleeve. Slots 25 define a plurality of flexible tabs or fingers 28 with inwardly bent tips 29. Fingers 28 are free to flex, and thus, lower end 26 of the sleeve is flexible.

Upper end 30 of sleeve 21 is identical to lower end 26 and includes a plurality of flexible fingers separated by slots that extend from upper end edge 31 of the sleeve. Hence, upper end 30 of the sleeve is flexible. Sleeve 21 is advantageously formed from a flat piece of sheet metal by first cutting the slots 25, punching vent openings 23, and forming bent tips 29, while the sheet is in its flat state. Then, the sheet is rolled to cylindrical form and the edges are joined along an interlocked double seam 32.

Tubular liner 24 takes the form of a tube of thin walled flexible material which may be resilient. Advantageously, the material of liner 24 is a rubber, unaffected by temperatures as high as 250° F., which may sometimes be encountered during abnormal operation of an engine cooling system.

Figure 3:
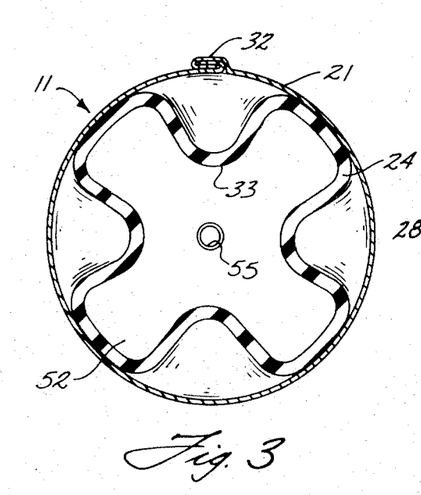
FIG. 3 is a transverse sectional view taken along line 3—3 of FIG. 2.
Figure 4:
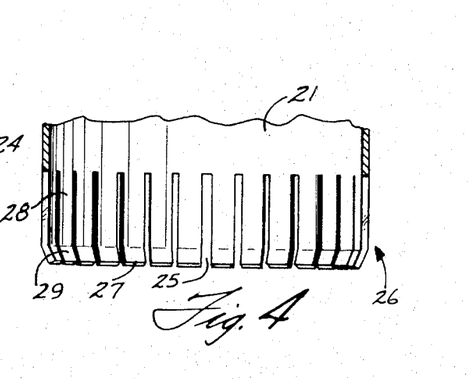
FIG. 4 is a partial sectional view of the lower end of the vacuum compensating device sleeve with other portions removed for clarity of illustration.

Liner 24 has a relaxed outside diameter which is somewhat greater than the inside diameter of sleeve 21. Hence, when the liner is relaxed as shown at FIGS. 2 and 3, the liner tends to bulge inwardly along folds 33, as illustrated.

As shown at FIG. 2, liner 24 is longer than sleeve 21 so its lower end portion 34 can be turned upwardly over lower end edge 27. End portion 34 is concentric with lower end 26 of sleeve 21 and extends along and engages the outside surface of lower end 26. Similarly, upper end 35 of the sleeve is turned outwardly over upper end edge 31 and extends along and engages flexible upper end 30 of the sleeve. A reinforcing band 36 extends between liner 24 and flexible lower end 26 of the sleeve to prevent damage to the liner by the fingers at the lower end of the sleeve. Band 36 is formed from rubber at least as thick as the rubber of liner 24. Similarly, a reinforcing band 37 identical to band 36, extends between flexible upper end 30 of the sleeve and liner 24.

The upper end of compensating device 11 is closed by a cup-shaped member 38 having a cylindrical side wall 39 and a flat end wall 40. Side wall 39 has a beveled inner end 41 to prevent damage to liner 24. End wall 40 has a suitable centrally located opening to receive the lower end of a radiator neck 42. Radiator neck 42 takes the form of an upright receptacle having a side wall 43 and an overflow opening 44 formed in the side wall and via which coolant expelled from compensating device 11 may readily flow from the filling neck. At the upper end of side wall 43 is the usual bayonet slot cam connector 45 of a radiator filling neck. The lower end of filling neck 42 has a generally flat annular sealing flange 46.

As shown at FIG. 2, side wall 39 of end member 38 has a diameter to be snuggly received within the upper end of liner 24. End member 38 is sealed to liner 24 by a screw clamp 47 which encircles end portion 35 of the liner. Clamp 47 exerts a radially inward force on upper end 35 of the liner which is transmitted to flexible upper end 30 of the sleeve, then to band 37, and then to inner end portion 48 of the liner, to tightly clamp inner end portion 48 into sealing engagement with the outside surface of side wall 39 of end member 38.

The lower end of compensating device 11 is closed by a cup-shaped lower end member 50 which has a cylindrical side wall 51 integral with a flat end wall 52. Side wall 51 has a beveled inner end 53 which is smoothly rounded to prevent damage to inner end portion 54 of the liner. End wall 52 is provided with a nipple 55 which extends through an opening in the end wall and is secured to the end wall by solder 56. Nipple 55 has a diameter to be inserted in the end of heater hose 15, whereupon the end of the heater hose is secured to the nipple by a screw type hose clamp 57.

Lower end member 50 is secured to the lower end of compensating device 11 in a manner identical to that explained for upper end member 38. Screw clamp 58 extends around external end portion 34 and transmits the radial compressive force from clamp 58 to flexible lower end 26 through reinforcing band 36 to clamp lower end 54 of the liner into tight sealing engagement with the exterior of side wall 51 of lower end member 50. Since lower end 26 of sleeve 21 is flexible, as previously explained, this lower end is compressed by the clamp and a tight leak-free seal is obtained between the side wall and the inner end portion 54 of the liner. The inwardly extending tips 29 of fingers 28 at the lower end of sleeve 21 prevent displacement of lower end member 50 axially outwardly of the compensating device, even when substantial pressures are present within the compensating device.

Filling neck 42 of the compensating device is closed by radiator cap 17. Cap 17 has a cap portion 58 adapted to lock onto the cam lock portion 45 of the filling neck. A sealing disc 59 at the lower end of cap assembly 17 is spring urged into sealing engagement with annular sealing flange 46 by a helically wound compression spring 60. Disc 59 is provided with a suitable annular gasket 61 which assures a liquid tight seal between the disc 59 and flange 46. Spring 60 and disc 59 function as an overpressure relief valve, disc 59 opening upwardly against the action of spring 60 in response to a predetermined pressure within compensating device 11.

Closing a central opening in disc 59 is a vacuum relief valve 62 comprised of a movable valve element 63 urged upwardly against the under side of disc 59 by a compression spring 64. Spring 64 and valve element 63 are so selected that the valve element 63 does not open until after a vacuum of 1-2 p.s.i. is present in compensating device 11. Hence, sufficient vacuum will be created within compensating device 11, upon cooling of the coolant in the engine cooling system to assure inward contraction of tubular liner 24 so it follows the collnat in the system. However, in the event that an abnormal condition is encountered and the vacuum in the system exceeds a safe level of 1 or 2 p.s.i., valve element 63 will open to prevent collapse of the delicate core 8 of radiator 4.

Figure 5:
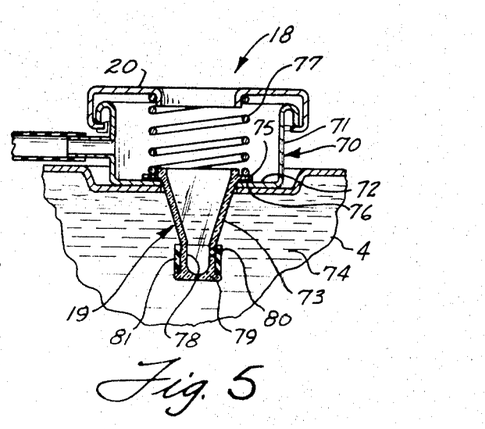
FIG. 5 is a partial view in section of a radiator showing a transparent viewing element sealing the radiator opening.

FIG. 5 shows the closure assembly 18 which seals radiator neck 70 of radiator 4. Radiator neck 70 has the usual upright side wall 71 which forms a receptacle. The lower end of side wall 71 is integral with a flat annular sealing flange 72. Viewing cone 19 has a conical body 73 which extends into collant 74 in the radiator, and a flange 75 which extends radially outwardly from the upper end of conical body 73. A resilient gasket 76 is interposed between the lower surface of flange 75 and the upper surface of sealing flange 72. A compression spring 77 extends between cap 20 and the upper surface of flange 75 to maintain viewing cone 19 in sealed relationship with the sealing flange 72. Cap 20 has a central opening so the interior of conical body 73 can be viewed to determine the coolant level without removing the cap. At the lower end of conical body 73 is a cylindrical tip 78 closed by an integral end 79. A vent opening 80 is formed through the wall of tip 78, and this opening is normally maintained closed by a wide elastic band 81 that extens around cylindrical tip 78. As described in my U.S. Pat. No. 3,276,488, closure assembly 18 can also be used to fill the cooling system of the vehicle without removing cap 20 by inserting a flexible hose into the interior of conical body 73.

Figure 6:
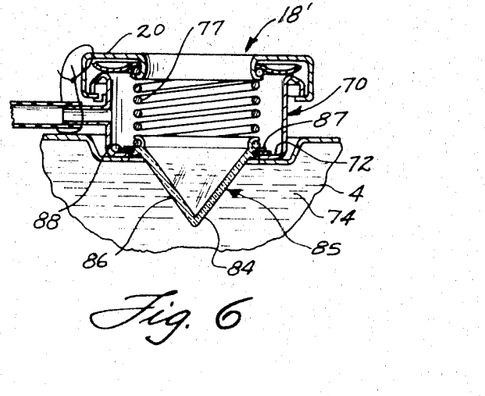
FIG. 6 is a view corresponding to FIG. 5 showing a different embodiment of transparent viewing device sealing the radiator opening.

FIG. 6 shows a closure assembly 18' which can be used to seal radiator neck 70 of radiator 4, in lieu of closure assembly 18. Here, viewing cone 85 terminates at a closed concial tip 84, and the conical body 86 of the viewing cone extends into coolant 74 in radiator 4. Flange 87, at the upper end of the conical body 86, is urged into sealing engagement with sealing flange 72 of the radiator neck. A gasket 88 is interposed between sealing flange 72 and flange 87 to assure a tight seal. Cap 20 has a central opening to permit viewing the interior of cone 86 and the cone is pressed into sealing engagement with sealing flange 72 by compression spring 77.

Because of the action of spring 77 of closure assembly 18, viewing cone 19 cooperates with the spring to provide an overpressure relief valve with the viewing cone acting as the movable valve element and unseating from sealing flange 72 in response to pressure within radiator 4 above a predetermined value. Advantageously, spring 77 is so selected that the pressure at which viewing cone 19 unseats from sealing flange 72 is slightly greater than the pressure at which the overpressure relief valve of cap assembly 17 releases. Preferably, closure assembly 18 releases overpressure at a value of ½ – 1 p.s.i. above the release value of the overpressure valve cap assembly 17.

Similarly, closure assembly 18' also functions as a pressure relief valve and spring 77 is again so selected that cap assembly 18' releases overpressure of a valve ½ – 1 p.s.i. above the overpressure release value of cap assembly 17.

Figure 7:
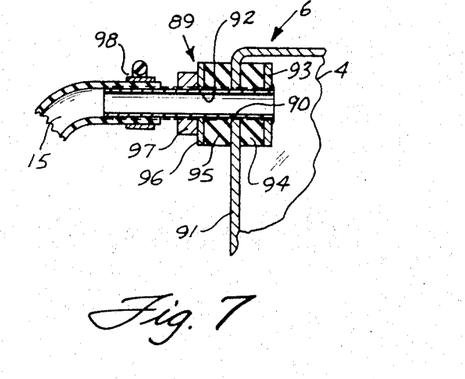
FIG. 7 is a partial view in section of the radiator showing the connector by which the vacuum compensating device is connected to the radiator.

FIG. 7 shows connector assembly 89 extending through an opening 90 of wall 91 of upper tank 6 of radiator 4. Connector assembly 89 includes an externally threaded tube 92 which comprises the body of the connector, and a metal washer 93 secured to the inner end of the tube as by soldering. Between washer 93 and wall 91 of the radiator is a resilient annular sealing gasket 94. A second resilient annular sealing gasket 95 extends over tube 92 and engages the outside of wall 91. A washer 96, freely slidable along tube 92, is disposed on the tube, and an internally threaded nut fastens the connector to wall 91. As nut 97 is tightened, washers 93 and 96 are compressed to seal tube 92 at opening 90 through wall 91. Tube 92 has a diameter to receive hose 15 which is slipped over the projecting end of the tube and secured to the tube in sealed relation thereto by a screw clamp 98.

Figure 8:
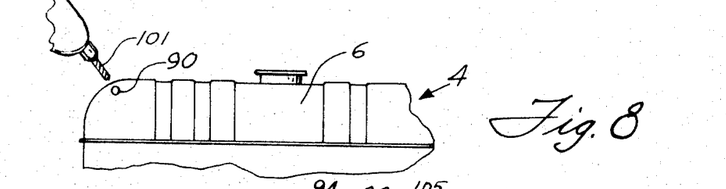
FIG. 8 is a front elevational view showing forming an opening for the connector in the upper radiator tank.
Figures 8A, 9, 10:
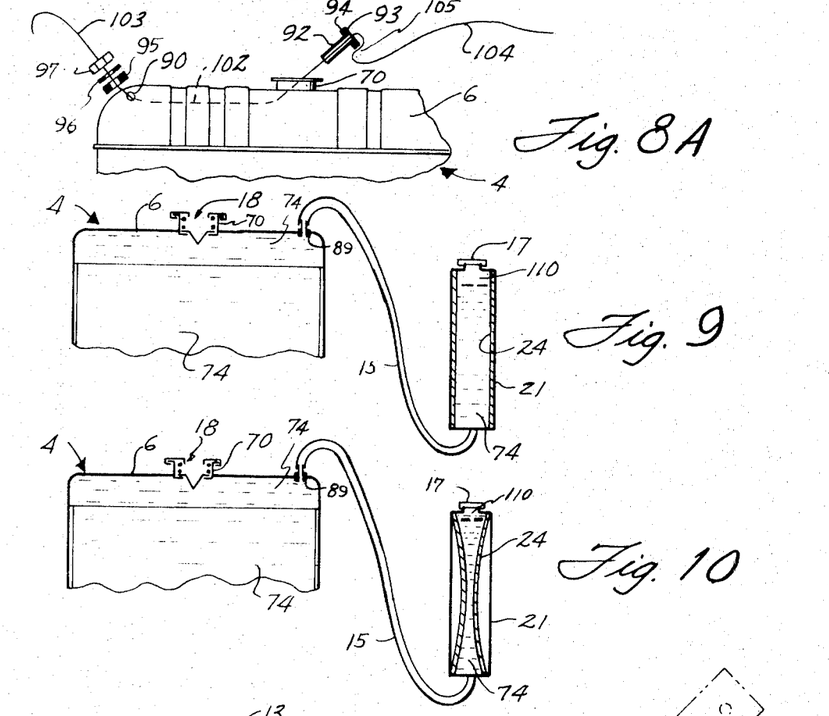
FIG. 8a is a view corresponding to FIG. 8 showing the method of installing the connector in the radiator tank.
FIG. 9 is a schematic view in section showing the level of coolant in the radiator and compensating device when the coolant is at normal operating temperature.
FIG. 10 is a view corresponding to FIG. 9 and showing the level of the coolant in the radiator and compensating device when the coolant is cold.

FIGS. 8 and 8a show the manner in which connector assembly 89 is installed in top tank 6 of radiator 4. As shown at FIG. 8, opening 90 is formed in the tank at an elevation as close as possible to the top of tank 6. Opening 90 may be formed with a drill 101, as illustrated at FIG. 8. Next, a thin readily deformable wire 102 (FIG. 8a) is threaded through opening 90 and radiator neck 70, which forms a filling or access opening for the radiator, so that ends 103 and 104 of the wire project from the respective openings. Next, tube 92 is slipped over end 104 of the wire with the tube portion extending toward radiator neck 70. Then, by manipulating wire 102, tube 92 with washer 93 secured thereto and gasket 94 thereon is guided through the upper tank 6 until tube 92 projects through oepning 90. Then, gasket 95, washer 96, and nut 97 are connected to the projecting end of tube 89 to secure the tube in position in the opening 90.

As shown at FIG. 8a, wire 102 is advantageously kinked as at 105 so tube 92 cannot slip in a direction away from filling neck 70. This kink 105 in the wire acts as a stop so that pulling end 103 of the wire which projects through opening 90 also pulls tube 92 toward and ultimately through the opening. After tube 92 is positioned in the opening, the end of the tube can either be grasped to install gasket 95, washer 96, and nut 97, or alternatively, the gasket, washer and nut can be slipped over end 103 of the wire, whereupon maintaining a pull on this end of the wire maintains the tube in position in the opening so that gasket 95, washer 96, and nut 97 can be applied to the tube to secure the tube to the radiator.

FIG. 9 shows the level of coolant in radiator 4 and vacuum compensating device 11 when the engine is at normal operating temperature and the coolant entering upper tank 6 of the radiator is at the usual temperature of 180° F. It will be observed, with reference to FIG. 9, that coolant 74 completely fills both radiator 4 and vacuum compensating device 11. The shown condition of the radiator and compensating device is an ideal condition in which the cooling system is completely filled with coolant. However, the vacuum compensating device may have a small amount of air, such as air 110 adjacent its upper end when the engine is at operating temperature. This small amount of air 110 is air which is difficult to remove from the system and is usually air which is trapped in the engine block and does not escape for some time after the cooling system is filled and sealed.

In FIGS. 9 and 10, connector assembly 89 is installed in the radiator so it extends through the top wall of top tank 6, and hence, communicates with the very top of the radiator. When the compensating device communicates with the top of the radiator, any air which leaks into the cooling system will be discharged to the compensating device the next time the coolant is heated, and will then be discharged through cap 17. The introduction of additional fresh air, which contains oxygen, would be deleterious to the system and ultimately could cause corrosion which would at least require adding a rust inhibitor or refilling the system with fresh coolant. However, as previously explained, air is not drawn into the system as the coolant cools. Such introduction of air is prevented by the vacuum valve 62, previously described for closure assembly 17, which maintains a low vacuum in the cooling system.

With coolant 74 at its operating temperature, there is a positive pressure in the cooling system which presses liner 24 into engagement with sleeve 21. The sleeve 21 contains the liner against over-expansion as a result of pressure in the system.

FIG. 10 shows the level of coolant in radiator 4 and vacuum compensating device 11 when the engine has been off for some time and the coolant is cooled to ambient temperature. Observe, that liner 24 is contracted inwardly and that the space within the compensating device is still substantially filled with coolant 74. This is because liner 24 has contracted to compensate for the reduction in volume of the coolant, when the coolant is cold. However, it should be observed with reference to FIG. 10 that radiator 4 is still completely filled with liquid coolant 74 and hence, the cooling system will operate at maximum efficiency when the engine is again started and the coolant is heated to the normal operating temperature of the engine.

It must be appreciated that closure assembly 18 seals the filling opening in the neck 70 of radiator 4 and hence, a vacuum can be created within the radiator to draw coolant 74 from compensating device 11 as the coolant contracts with a decrease in temperature. As previously explained, the vacuum valve of closure assembly 18 opens at a vacuum within the system which is greater than the vacuum in the system required to open the vacuum valve of cap assembly 17. Hence, as the coolant contracts and its temperature decreases below a predetermined value, the vacuum in radiator 4 will draw coolant from the compensating device into the radiator and hence, the radiator will always be maintained full of liquid coolant, so long as the system operates normally.

Figure 14:
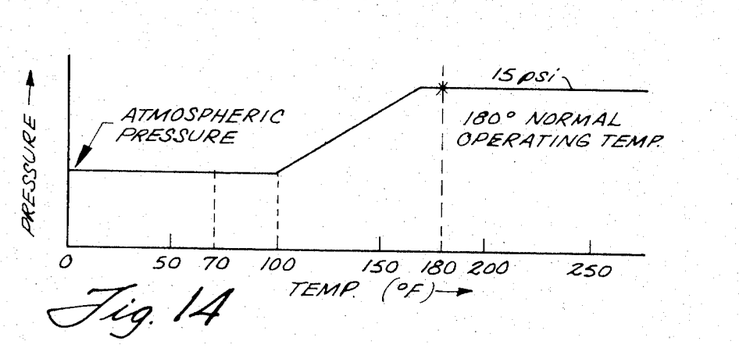
FIG. 14 is a graph showing the relationship of coolant temperature and pressure in a normal pressurized cooling system.

FIG. 14 shows graphically, the relationship between pressure and temperature of coolant in a conventional pressurized cooling system. Assume that the ambient temperature is 70° F., and there is air in the upper tank of the radiator as a result of contraction of the coolant from operating temperature. As the coolant heats, the pressure of the coolant immediately increases in direct proportion to the increase in temperature until the overpressure relief valve of the radiator pressure cap is reached. Then, the overpressure valve opens and vents air, and usually some coolant vapor at atmosphere and the valve containues to "pop off" until the coolant reaches its normal operating temperature of 180°. When the coolant again cools, air is drawn into the radiator through the vacuum valve which, in the standard radiator cap, opens in response to even a slight vacuum in the cooling system.

As shown at FIG. 14, with the ambient temperature at 70° F., the coolant expands a sufficient amount during heating that the cooling system is under a pressure of 15 p.s.i. (above atmospheric pressure) when the coolant temperature reaches 130° F. When the ambient temperature is 100°, the system will not be pressurized to 15 p.s.i. until the coolant temperature reaches 160° F., whereupon the pressure cap will "pop off" and maintain the pressure at 15 p.s.i. This 15 p.s.i. pressure is then maintained by the pressure relief valve of the radiator cap until operating temperature is reached.

Figure 15:
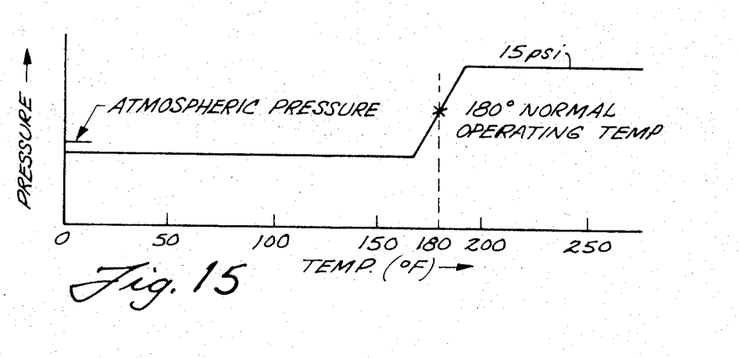
FIG. 15 is a graph showing the relationship of coolant temperature and pressure in an engine cooling system equipped with applicant's vacuum compensating device.

Now consider FIG. 15 which shows the pressure within the cooling system of an engine equipped with the vacuum compensating device of this invention. As shown at FIG. 10, with the coolant cold, liner 24 is contracted and there is little if any air in the space above the coolant in the compensating device. Also, there is no air at all in the upper tank 6 of radiator 4. By virtue of the action of the tubular liner 24, there is a slight negative pressure or vacuum in the cooling system. However, this negative prssure is negligible at this time because atmospheric pressure acts on the outside surface of liner 24 via the vent openings 23 to maintain the liner in contact with the remaining coolant in vacuum compensating device. As the temperature of the coolant is compensated for by the liner 24 which merely expands outwardly and hence, the pressure within the cooling system is initially only very slightly greater than atmospheric. Thus, the cooling system is not exposed to any substantial pressure above atmospheric. As the coolant continues to expand with increased temperature, the coolant ultimately fills the liner 24 and it is pressed against the inside of sleeve 21. After the liner is pressed against sleeve 21, and is contained against further expansion by the sleeve, then the pressure within the cooling system begins to rise. However, the pressure rises at a far more rapid rate per degree of increase of coolant temperature since there is little, if any air in the system. Hence, the cooling system equipped with the compensating device of this invention normally has pressures therein substantially lower than in the normal pressurized radiator system. However, when the temperature of the coolant nears its boiling point, or the limit of its expansion, the pressure in the compensating device equipped system increases rapidly, and correspondingly, the boiling point of the coolant is increased by the higher pressure in the system. Hence, pressures in the compensating device equipped system increase to a level approaching the 15 p.s.i. "pop off" pressure of the overpressure relief valve only when the higher pressure is needed to prevent boiling of the coolant. Only when an abnormal condition occurs within the radiator, such as boiling of the coolant, does the pressure within the cooling system reach the 15 p.s.i. above atmospheric required to operate the overpressure relief valve. Hence, the advantage of the vacuum compensating device of this invention is to maintain a substantially lower pressure within the cooling system while still maintaining the radiator substantially full of liquid coolant at all times for most efficient cooling of the engine.

It is to be appreciated that the absence of high pressures within the cooling system, especially at low temperatures when the hoses of the system are less flexible, and the fittings to which the hoses are connected are in a contracted state is a distinct advantage in reducing maintenance of the cooling system equipped with the vacuum compensating device.

Figure 11:
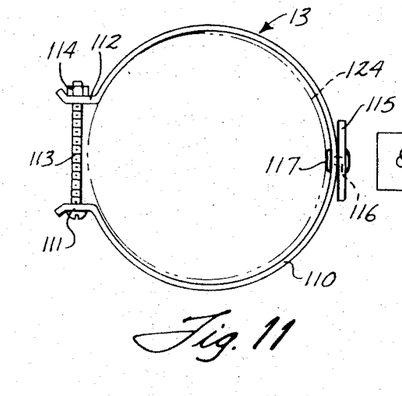
FIG. 11 is a plan view of a bracket for mounting the compensating device.
Figure 12:
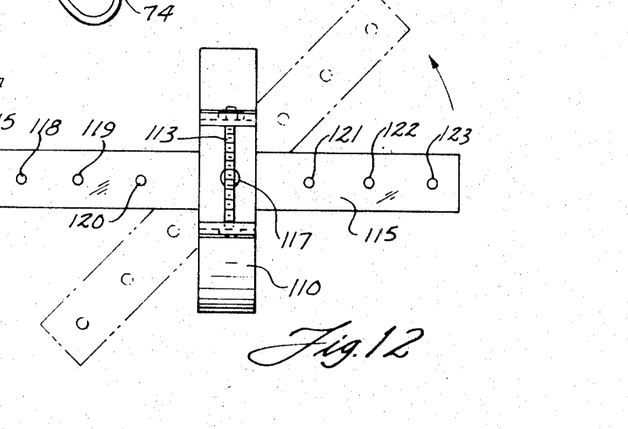
FIG. 12 is a left-hand side view of the bracket of FIG. 11.
Figure 13:
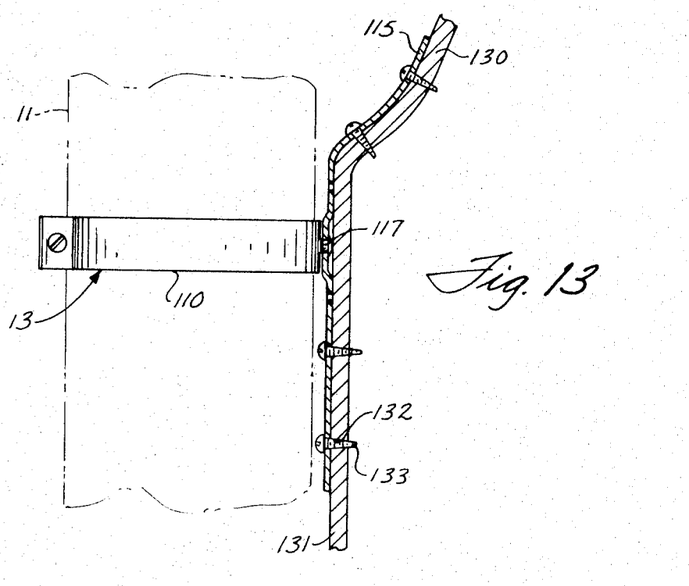
FIG. 13 is a longitudinal sectional view of the bracket showing the mounting bracket with its mounting strap deformed and secured to a side wall of the engine compartment.

As shown in FIG. 1, compensating device 11 is provided with brackets 13 and 14 by which the compensating device is mounted adjacent radiator 4 in engine compartment 1. Bracket 13 is shown at FIGS. 11 – 13. The bracket includes an arcuately curved clamp portion or band 110 formed from light guage sheet metal. The free ends 111 and 112 of the band are generally parallel and have aligned openings therein to receive a screw 113 having a nut 114 threaded on one end. An elongated strap 115 has a central opening 116 via which the strap is connected to band 110 by a rivet 117. Rivet 117 extends through an opening in the band at a location diametrically opposite screw 113 to pivotally connect strap 115 to band 110. As shown at FIG. 12, strap 115 is free to pivot relative to the band, and hence, can be adjusted to any desired angular position to facilitate mounting in the crowded engine compartment of the modern automobile. Strap 115 is formed from light gauge sheet metal which is readily deformable manually. The strap has a series of bolt receiving openings 118 – 123 formed therein. Openings 118 – 120 are formed in the strap on one side of rivet 117 and openings 121 – 123 are formed in the strap on the other side of rivet 117. When secured to band 110 by the rivet, strap 115 is tangent to the band.

As shown at FIG. 11, band 110 encircles the sleeve of the compensating device, the outline of which is represented by phantom line 124.

When screw 113 is tightened, band 110 tightly grips the compensating device sleeve, and is secured to sleeve against movement. Merely loosening screw 113 allows the band, and hence, strap 115 connected to the band, to be adjusted both circumferentially and axially relative to the sleeve of the compensating device. Since bracket 14 is identical to bracket 13, it will not be described in detail. However, it is to be understood that bracket 14 can be adjusted relative to the compensating device in the manner described for bracket 13.

FIG. 13 shows bracket 13 mounted on engine compartment wall 130 which presents an uneven surface 131. With known brackets, securing same to the uneven wall would be quite difficult. With bracket 13, it is merely necessary to apply hand pressure to strap 11, to conform the strap to the surface configuration of the wall. Then, holes 132 can be drilled or punched in wall 130 in alignment with the openings in the strap, and the bracket is secured to the wall with self tapping sheet metal screws 133. Since strap 115 is relatively wide, as shown at FIG. 12, compensating device 11 is securely mounted on the wall 130. Bracket 14, not shown at FIG. 13, will also be secured to wall 130 by screws 133 to securely mount compensating device 11.

While a preferred embodiment of an engine cooling system including a vacuum compensating device, the details of the vacuum compensating device, a method of installing a fitting to connect the compensating device to the radiator, and a bracket arrangement to mount the compensating device have been shown and described in detail, it is contemplated that numerous changes can be made in these embodiments and methods without departing from the intended scope of this invention.

What is claimed is:

1. A vacuum compensating device for an engine cooling system comprising
   an elongated cylindrical sleeve comprising
      a substantially rigid body portion,
      a first flexible end portion, and
      a second flexible end portion;
   a tubular liner of flexible material within said sleeve and supported by the sleeve;
   a first end member engaging said liner adjacent one end thereof;
   first securing means securing said liner to said first end member in sealed relation thereto, and comprising
      clamp means clamping said liner to said end member and said first flexible end portion of said sleeve to said liner;
   a second end member engaging said liner adjacent the opposite end thereof;
   second securing means securing said liner to said second end member in sealed relation thereto, and comprising
      clamp means clamping said liner to said second end member and said second flexible end portion of said sleeve to said liner;
   said first end member having a filling opening therein via which liquid coolant can be introduced to the interior of said liner; and
   said second end member including connecting means to connect a conduit of substantially smaller diameter than said liner to said end member in communication with the interior of said liner.

2. A vacuum compensating device according to claim 1 wherein
   said liner has a length greater than the length of said sleeve, as measured between end edges of said flexible ends of the sleeve, to provide first and second liner ends;
   said first projecting liner end extending around the end edge of said one of said flexible end portions and concentrically along said end portion;
   said second projecting liner end extending around the end edge of said second flexible end portion and concentrically along said end portion;
   said clamp means of said first and second securing means each encircling the respective projecting ends of said liner and exerting radially inward pressure on said projecting ends.

3. A vacuum compensating device according to claim 2 wherein
   said liner is connected to said sleeve only adjacent its ends, and a substantial portion of said liner between its ends is freely contractable.

4. A vacuum compensating device for an engine cooling system, said device receiving coolant from the system as the coolant expands and returning coolant to the system as the coolant contracts, without introducing air into the cooling system, said compensating device comprising,
   an elongated rigid sleeve;
   a tubular liner of flexible material within said sleeve and supported by the sleeve;
   a first end member engaging said liner adjacent one end thereof;
   first securing means securing said first end member to said liner in sealed relation thereto, adjacent one end of said sleeve;
   a second end member engaging said liner adjacent the opposite end thereof;
   second securing means securing said second end member to said liner in sealed relation thereto, adjacent the opposite end of said sleeve;
   said liner between said first and second securing means, having an unobstructed and unsupported interior portion, whereby said sleeve is free to contract;

said sleeve having vent openings communicating with the region between the sleeve and the liner, whereby the liner is exposed to atmospheric pressure and is free to expand into full engagement with said sleeve, and is free to contract within said sleeve;

said first end member having a filling opening therein via which liquid coolant can be poured into the interior of said liner;

said second end member including connecting means to connect a conduit of substantially smaller diameter than said liner to said end member and in communication with the interior of said liner;

and wherein;

said first end member is cup shaped and extends into one end of said liner;

said second end member is cup shaped and extends into the other end of said liner;

said sleeve extends around said liner and end members; and said first and second securing means each include clamp means surrounding said sleeve adjacent the respective ends thereof and clamping said sleeve against said liner and said liner against said respective end members.

* * * * *